United States Patent
Ollila et al.

(10) Patent No.: US 9,112,822 B2
(45) Date of Patent: Aug. 18, 2015

(54) METHOD AND APPARATUS FOR SUGGESTING A MESSAGE SEGMENT FOR A DRAFT A MESSAGE BASED ON A CONTEXTUAL CHARACTERISTIC

(71) Applicant: Nokia Technologies Oy, Espoo (FI)

(72) Inventors: Elina Ollila, Kirkkonummi (FI); Mika Rautava, Espoo (FI); Leo Karkkainen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/055,122

(22) Filed: Oct. 16, 2013

(65) Prior Publication Data

US 2014/0040406 A1  Feb. 6, 2014

Related U.S. Application Data

(63) Continuation of application No. 12/795,047, filed on Jun. 7, 2010, now Pat. No. 8,583,148.

(51) Int. Cl.
*H04L 12/58* (2006.01)
*G06F 3/023* (2006.01)
(Continued)

(52) U.S. Cl.
CPC .............. *H04L 51/02* (2013.01); *G06F 3/0237* (2013.01); *H04M 1/72522* (2013.01); *H04M 1/72552* (2013.01); *G06F 2203/011* (2013.01);
(Continued)

(58) Field of Classification Search
CPC . G06F 2203/011; G06F 3/0237; H04L 51/02; H04M 1/575; H04M 1/72522; H04M 1/72552; H04M 1/72566; H04M 1/72569

USPC .......... 455/412.1–414.4, 460–466; 379/88.01–88.28, 93.01–93.37; 706/15–21

See application file for complete search history.

(56) References Cited

U.S. PATENT DOCUMENTS

| 6,085,201 A | 7/2000 | Tso | |
| 8,583,148 B2 * | 11/2013 | Ollila et al. | 455/466 |

(Continued)

FOREIGN PATENT DOCUMENTS

| CN | 101149757 A | 3/2008 |
| WO | WO 01/41457 A2 | 6/2001 |

OTHER PUBLICATIONS

International Search Report and Written Opinion for Application No. PCT/IB2011/052461 dated Oct. 10, 2011.

(Continued)

*Primary Examiner* — Kashif Siddiqui
(74) *Attorney, Agent, or Firm* — Alston & Bird LLP

(57) ABSTRACT

An apparatus may include a messaging module configured to suggest a message segment in order to draft a message. A contextual characteristic determiner may be used to determine contextual characteristics of the apparatus, the recipient of a call, and/or the user of the apparatus and thereby the messaging module may suggest the message segment based on the contextual characteristics. The contextual characteristics may include user emotions, which may be recognized by an emotion recognizer. Message segments may also be based on prior messaging history. Thereby, the apparatus may suggest message segments in order to more easily draft messages when, for example, initiating or responding to attempted voice communications. Further, the apparatus may include a reminder scheduler which is configured to schedule a reminder to respond to an attempted voice communication.

14 Claims, 5 Drawing Sheets

(51) Int. Cl.
*H04M 1/725* (2006.01)
*H04M 1/57* (2006.01)

(52) U.S. Cl.
CPC .......... *H04M1/575* (2013.01); *H04M 1/72566* (2013.01); *H04M 1/72569* (2013.01)

(56) References Cited

U.S. PATENT DOCUMENTS

| | | | |
|---|---|---|---|
| 2001/0031633 A1* | 10/2001 | Tuomela et al. | 455/417 |
| 2006/0025091 A1* | 2/2006 | Buford | 455/154.2 |
| 2006/0224722 A1 | 10/2006 | McGowan et al. | |
| 2008/0104169 A1* | 5/2008 | Combel et al. | 709/204 |
| 2008/0243736 A1* | 10/2008 | Rieman et al. | 706/18 |
| 2009/0316862 A1* | 12/2009 | Sugimoto et al. | 379/88.01 |
| 2010/0086112 A1* | 4/2010 | Jiang et al. | 379/93.23 |
| 2010/0120456 A1* | 5/2010 | Karmarkar et al. | 455/466 |
| 2010/0255865 A1 | 10/2010 | Karmarkar | |

OTHER PUBLICATIONS

Office Action for Chinese Application No. 201180036602.7 dated Dec. 17, 2014, 8 pages.

* cited by examiner

METHOD AND APPARATUS FOR SUGGESTING A MESSAGE SEGMENT FOR A DRAFT A MESSAGE BASED ON A CONTEXTUAL CHARACTERISTIC

CROSS REFERENCE TO RELATED APPLICATION

This application is a continuation of and claims priority to U.S. application Ser. No. 12/795,047, filed Jun. 7, 2010, the entire contents of which are hereby incorporated by reference.

TECHNOLOGICAL FIELD

Embodiments of the present invention relate generally to message segments for drafting messages and, more particularly, relate to an apparatus, method and a computer program product configured to suggest a message segment based on a contextual characteristic in order to draft a message.

BACKGROUND

In order to provide easier or faster information transfer and convenience, telecommunication industry service providers are continually developing improvements to existing communication networks. As a result, wireless communication has become increasingly more reliable in recent years. Along with the expansion and improvement of wireless communication networks, mobile terminals used for wireless communication have also been continually improving. In this regard, due at least in part to reductions in size and cost, along with improvements in battery life and computing capacity, mobile terminals have become more capable, easier to use, and cheaper to obtain. Due to the now ubiquitous nature of mobile terminals, people of all ages and education levels are utilizing mobile terminals to communicate with other individuals or contacts, receive services and/or share information, media and other content.

One of the technologies enabled by mobile terminals which has become more popular is that of text messaging. Text messaging allows users to quickly send short messages between mobile terminals. While this technology may provide a convenient way to convey information, further uses of this technology may be possible. For example, the interaction of text messaging with other user terminal functionality may not yet be fully developed.

BRIEF SUMMARY

A method, apparatus and computer program product are therefore provided that may suggest a message segment based on a contextual characteristic in order to draft a message.

In an example embodiment, an improved apparatus comprises at least one processor and at least one memory including computer program code, the at least one memory and the computer program code configured to, with the processor, cause the apparatus to determine a contextual characteristic, suggest a message segment based on the contextual characteristic in order to draft a message, and cause transmission of the message.

In an additional example embodiment a method comprises determining a contextual characteristic, suggesting a message segment based on the contextual characteristic in order to draft a message via a processor, and causing transmission of the message.

In a further example embodiment a computer program product comprises at least one computer-readable storage medium having computer-executable program code portions stored therein, the computer-executable program code portions comprising program code instructions for determining a contextual characteristic, program code instructions for suggesting a message segment based on the contextual characteristic in order to draft a message, and program code instructions for causing transmission of the message.

Accordingly, embodiments of the present invention may suggest a message segment based on a contextual characteristic in order to draft a message, thereby facilitating communication between users either in addition to or instead of voice communications.

BRIEF DESCRIPTION OF THE SEVERAL VIEWS OF THE DRAWINGS

Figure 1:
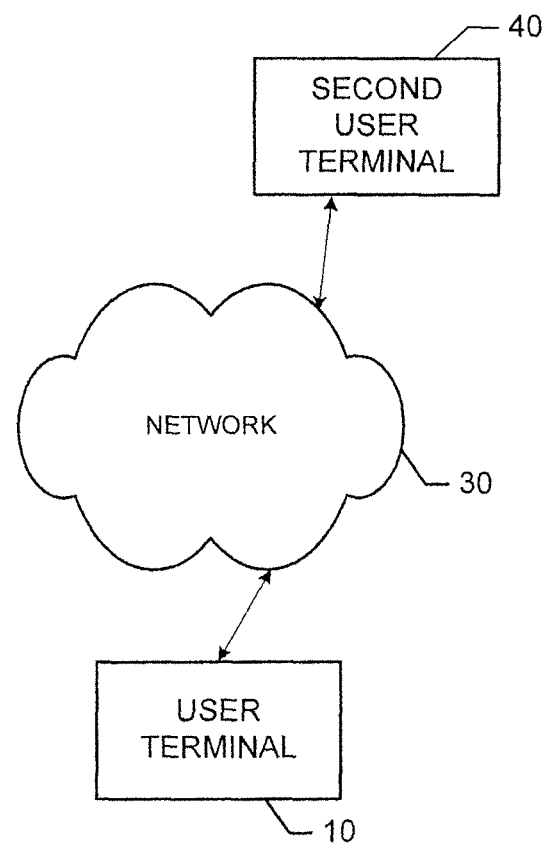
Figure 2:
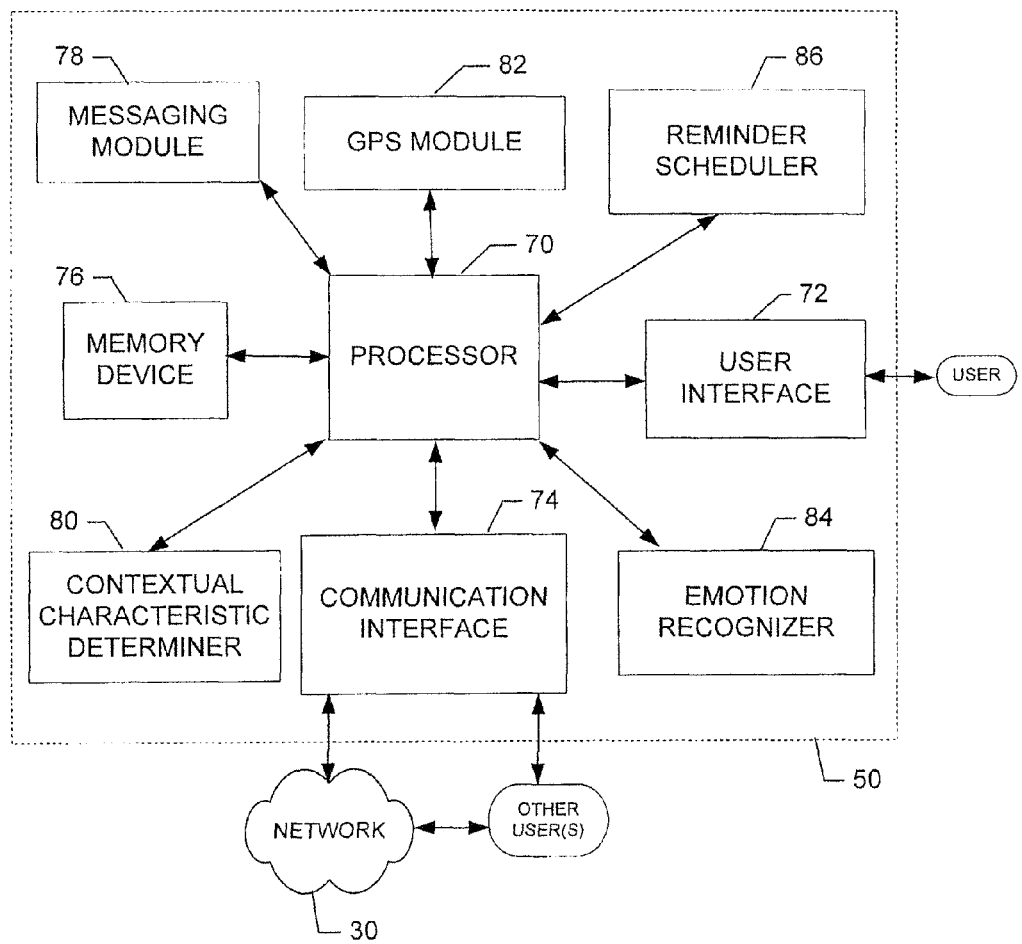
Figure 3:
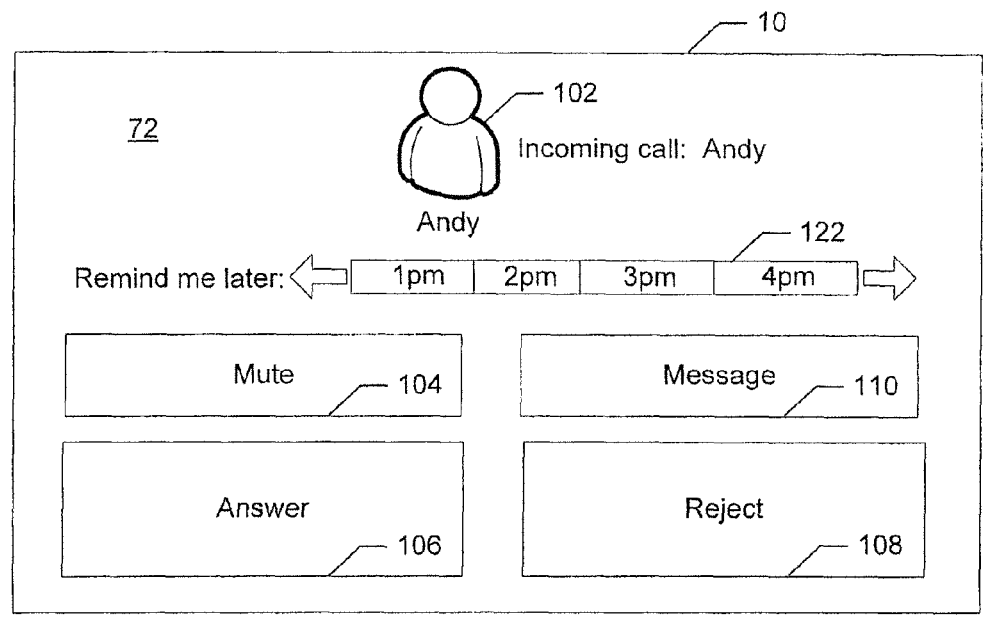
Figure 4:
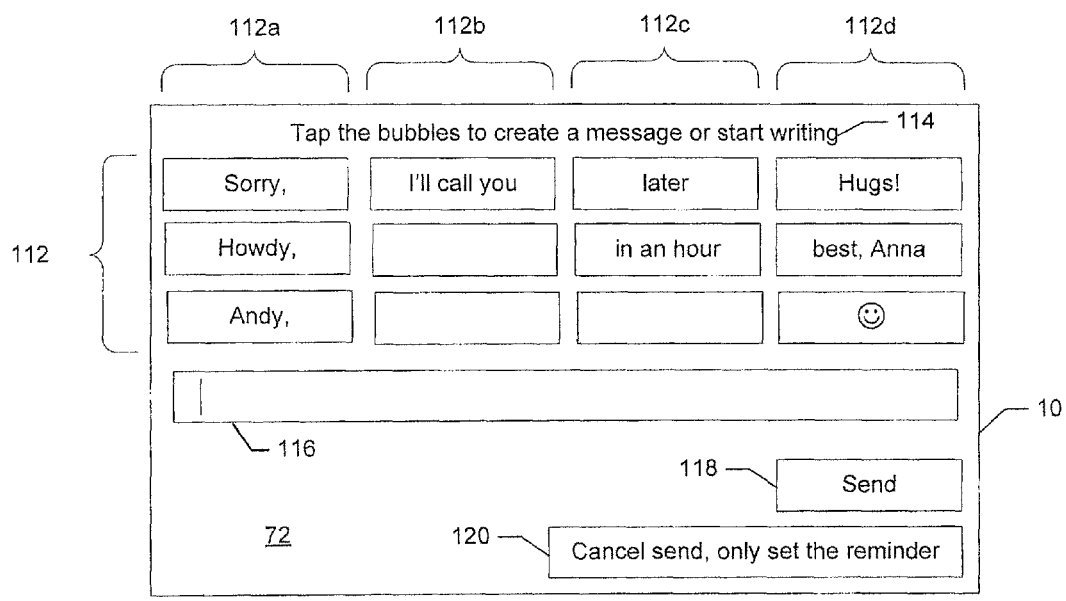
Figure 5:
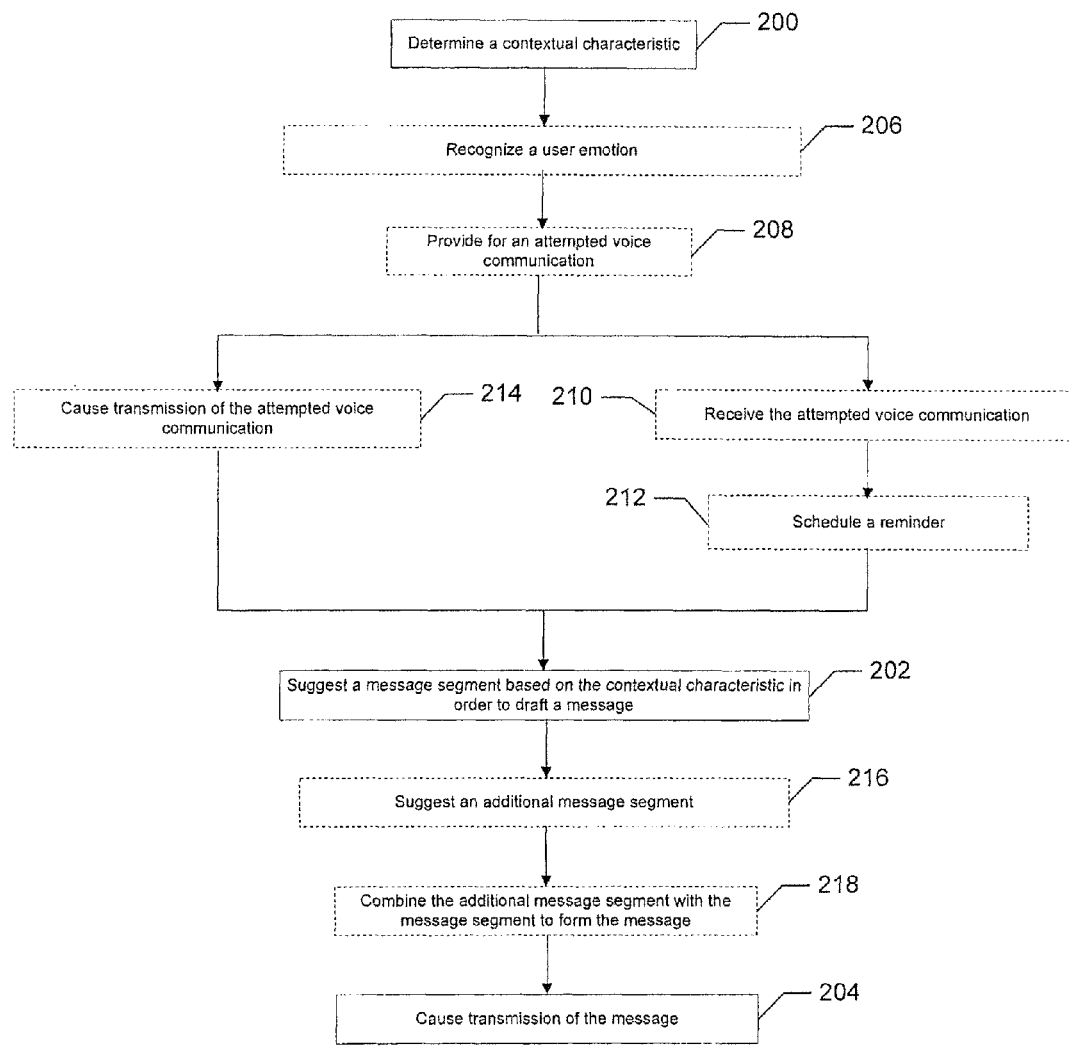

Having thus described embodiments of the present disclosure in general terms, reference will now be made to the accompanying drawings, which are not necessarily drawn to scale, and wherein:

FIG. 1 illustrates a schematic block diagram of a system according to an example embodiment of the present invention;

FIG. 2 illustrates a schematic block diagram of an apparatus configured to suggest a message segment based on a contextual characteristic in order to draft a message according to an example embodiment of the present invention;

FIG. 3 illustrates the user terminal of FIG. 1 when the user terminal is receiving an attempted voice communication according to an example embodiment of the present invention;

FIG. 4 illustrates the user terminal of FIG. 1 when the user terminal is suggesting message segments in order to draft a message corresponding to the attempted voice communication; and FIG. 5 illustrates a flowchart according to an example method for suggesting a message segment based on a contextual characteristic in order to draft a message in accordance with an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

As used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein;

and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As indicated above, embodiments of the present invention may be employed in methods, apparatuses and computer program products configured to suggest a message segment based on a contextual characteristic in order to draft a message. A message segment, as used herein, refers to one or more words, symbols, emoticons, acronyms, or other combination of characters, symbols or graphical equivalents thereof. Messages may in some embodiments comprise text messages or emails. Further, an attempted voice communication, as used herein as will be described below, refers to phone calls, Voice over Internet Protocol (VoIP) communications, video conferencing, and other forms of communication which involve the transmission of audio, regardless of whether the communication is accepted or rejected by the user and thereby regardless of whether voice communication actually occurs.

In this regard, for example, FIG. 1 illustrates a block diagram of a system that may benefit from embodiments of the present invention. It should be understood, however, that the system as illustrated and hereinafter described is merely illustrative of one system that may benefit from embodiments of the present invention and, therefore, should not be taken to limit the scope of embodiments of the present invention.

As shown in FIG. 1, an embodiment of a system in accordance with an example embodiment of the present invention may include a user terminal 10. The user terminal 10 may be any of multiple types of fixed or mobile communication and/or computing devices such as, for example, portable digital assistants (PDAs), pagers, mobile televisions, mobile telephones, gaming devices, laptop computers, personal computers (PCs), cameras, camera phones, video recorders, audio/video players, radios, global positioning system (GPS) devices, or any combination of the aforementioned, and other types of voice and text communications systems, which employ embodiments of the present invention.

In some embodiments the user terminal 10 may be capable of communicating with other devices, either directly, or via a network 30. The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. Thus, the network 30 may be a cellular network, a mobile network and/or a data network, such as a local area network (LAN), a metropolitan area network (MAN), and/or a wide area network (WAN), for example, the Internet. In turn, other devices such as processing elements (for example, personal computers, server computers or the like) may be included in or coupled to the network 30. By directly or indirectly connecting the user terminal 10 and the other devices to the network 30, the user terminal and/or the other devices may be enabled to communicate with each other, for example, according to numerous communication protocols including Hypertext Transfer Protocol (HTTP) and/or the like, to thereby carry out various communication or other functions of the mobile terminal and the other devices, respectively. As such, the user terminal 10 and the other devices may be enabled to communicate with the network 30 and/or each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as wireless LAN (WLAN), Worldwide Interoperability for Microwave Access (WiMAX), WiFi, ultra-wide band (UWB), Wibree techniques and/or the like and fixed access mechanisms such as digital subscriber line (DSL), cable modems, Ethernet and/or the like. Thus, for example, the network 30 may be a home network or other network providing local connectivity.

The system may further comprise a second user terminal 40. The second user terminal 40 may be any of multiple types of fixed or mobile communication and/or computing devices such as, for example, portable digital assistants (PDAs), pagers, mobile televisions, mobile telephones, gaming devices, laptop computers, personal computers (PCs), cameras, camera phones, video recorders, audio/video players, radios, global positioning system (GPS) devices, or any combination of the aforementioned, and other types of voice and text communications systems, which employ embodiments of the present invention. The second user terminal 40 may be capable of communicating with the user terminal 10 either directly, or through the network 30. Thereby, for example, the user terminal 10 may communicate with the second user terminal 40 through sending and/or receiving electronic communications including text messages and emails and voice communications including phone calls, VoIP calls, video conference calls, etcetera. Text messages may be sent via Short Message Service (SMS) and/or Instant Messaging (IM) in some embodiments. Accordingly, the user terminal 10 and the second user terminal 40 may communicate with one another via a variety of methods and technologies in various embodiments.

In an example embodiment, an apparatus 50 is provided that may be employed by devices performing example embodiments of the present invention. The apparatus 50 may be embodied, for example, as any device hosting, including, controlling or otherwise comprising the user terminal 10 and/or the second user terminal 40. However, embodiments may also be embodied on a plurality of other devices such as for example where instances of the apparatus 50 may be embodied on the network 30. As such, the apparatus 50 of FIG. 2 is merely an example and may include more, or in some cases less, than the components shown in FIG. 2.

With further regard to FIG. 2, the apparatus 50 is configured to suggest a message segment based on a contextual characteristic in order to draft a message. The apparatus 50 may include or otherwise be in communication with a processor 70, a user interface 72, a communication interface 74 and a memory device 76. The memory device 76 may include, for example, volatile and/or non-volatile memory. The memory device 76 may be configured to store information, data, files, applications, instructions or the like. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a hardware accelerator, a special-purpose computer chip, or the like. In an example embodiment, the processor 70 may be configured to execute instructions stored in the memory device 76 or otherwise accessible to the processor. Alternatively or additionally, the processor 70 may be configured to execute hard coded functionality. As such, whether configured by hardware or software methods, or by a combination thereof, the processor 70 may represent an entity (for example, physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor to perform the algorithms and/or operations described herein when the instructions are executed. However, in some cases, the processor 70 may be a processor of a specific device (for example, a mobile terminal or network device such as a server) adapted for employing embodiments of the present invention by further configuration of the processor by instructions for performing the algorithms and/or operations described herein. The processor 70 may include, among other things, a clock, an arithmetic logic unit (ALU) and logic gates configured to support operation of the processor.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (for example, network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 74 may include hardware and/or software for supporting communication mechanisms such as BLUETOOTH®, Infrared, UWB, WiFi, and/or the like, which are being increasingly employed in connection with providing home connectivity solutions. Accordingly, the communication interface 74 may enable the apparatus 50 to send and/or receive messages including text messages and emails and voice communications including phone calls, VoIP calls, video conferences, etcetera.

The user interface 72 may be in communication with the processor 70 to receive an indication of a user input at the user interface and/or to provide an audible, visual, mechanical or other output to the user. As such, the user interface 72 may include, for example, a keyboard, a mouse, a joystick, a display, a touch screen, a microphone, a speaker, or other input/output mechanisms.

The processor 70 may comprise user interface circuitry configured to control at least some functions of one or more elements of the user interface 72, such as, for example, the speaker, the ringer, the microphone, the display, and/or the like. The processor 70 and/or user interface circuitry comprising the processor 70 may be configured to control one or more functions of one or more elements of the user interface 72 through computer program instructions (for example, software and/or firmware) stored on a memory accessible to the processor 70 (for example, memory device 76, and/or the like).

The apparatus 50 may further comprise a messaging module 78 which is configured to suggest a message segment in order to draft a message. The processor 70 may be embodied as, include or otherwise control the messaging module 78. In some embodiments the messaging module 78 may suggest a message segment for a message which is in response to an attempted voice communication which the apparatus 50 receives. Accordingly, the message may respond to the attempted voice communication.

For example, FIG. 3 illustrates the user terminal 10 when it embodies the apparatus 50 and the user terminal is receiving an attempted voice communication. As illustrated, the attempted voice communication is originating from a caller 102 having the name "Andy." For example, the call may be originating from the second user terminal 40. Accordingly, the apparatus 50 may provide the user with a variety of options which may be selected using the user interface 72. The user interface 72 may, for example, comprise physical buttons and or virtual buttons which are displayed on a touch screen. For example, the user interface 72 may allow the user to mute the ringing using a mute button 104, answer the call with an answer button 106, or reject the call using a reject button 108.

The apparatus 50 may further provide the user with an option to send a message to the caller which is trying to reach the user, and thereby the user interface 72 may include a message button 110. When the user presses the message button 110, the user interface 72 may then prompt the user to draft a message to send to the caller, as illustrated in FIG. 4. The messaging module 78 may thereby suggest one or more message segments 112 in order to draft a message corresponding to the attempted voice communication. For example, in the illustrated embodiment the user is provided with message segments 112 in the form of introductory phrases 112a, first middle phrases 112b, second middle phrases 112c, and ending phrases 112d. As indicated by the user instructions 114, the user may either use the message segments 112 to draft a message, or the user may manually enter a message in the text box 116, or a combination of both. Thereby, the user may draft a message.

The message segments 112 may be configured to be selected to form a complete message. In this regard, the introductory phrases 112a may include an introduction, the first 112b and second 112c middle phrases may include substantive information, and the ending phrases 112d may include a salutation. In some embodiments the user may be able to select one of the introductory phrases 112a, for example "Howdy," and combine this message segment 112 with an additional message segment suggested by the messaging module 78. For example, the user may draft a message using the message segments 112 which reads, "Howdy, call you in an hour. Hugs!" The user may be allowed to combine as many of the message segments 112 as desired in some embodiments. For example, the user may select both the "Howdy," and the "Andy," introductory phrases 112a when drafting a message. In some embodiments the messaging module 78 may include grammatical logic configured to adjust the punctuation to conform to proper sentence structures. Thus, for example, rather than drafting a message which begins with "Howdy, Andy,", the messaging module 78 may instead draft a message which begins with "Howdy Andy," and is thus more grammatically correct.

The message segment candidates that are displayed to a user for selection may be predefined in one embodiment. However, in other embodiments, the messaging module 78 may tailor the message segment candidates and therefore vary the message segment candidates based upon various factors. For example, the messaging module 78 of one embodiment may suggest the message segment based on a contextual characteristic. Thus, the apparatus 50 may further include a contextual characteristic determiner 80, as illustrated in FIG. 2, which is configured to determine a contextual characteristic. The processor 70 may be embodied as, include or otherwise control the contextual characteristic determiner 80.

Contextual characteristics may include the present time, location, activity, etcetera of the user and/or the apparatus 50. Further, contextual characteristics may relate to the caller 102, e.g., Andy, from which the attempted voice communication originates. For example, one of the introductory phrases 112a illustrated in FIG. 4 reads "Andy,". Accordingly, the user may be able to select a message segment 112 for drafting a message which is tailored to specifically relate to the caller 102. The contextual characteristic determiner 80 may determine that Andy is the name of the caller 102 through contact information stored in the apparatus 50, for example in the memory 76. Additional contextual characteristics may relate to the user, and in particular the user's schedule. For example, if the attempted voice communication is received during an activity which is entered into a user calendar which is stored in the apparatus 50 or otherwise accessible by the apparatus, the contextual characteristic determiner 80 may suggest message segments 112 which relate to calling the caller 102 back after the end of the scheduled activity and during a free period in the user's schedule. For example, the second middle phrases 112c include a message segment 112 which states "in an hour". This message segment 112 may, for example, be displayed if the user is currently involved in an activity which is scheduled to end in an hour. Thereby, the user may use the first 112b and second 112c middle phrases to form a message which states that the user will call the caller 102 in an hour.

Further, the apparatus 50 may provide features intended to account for situations in which the user terminal 10 receives multiple attempted voice communications from different callers during the scheduled activity or during an ongoing voice communication. In such instances, the messaging module 78 may suggest one or more message segments 112 which take into account the fact that the user may not want or be able to contact all of the callers at the same time. For example, if the scheduled activity ends in an hour, the user may only be able to contact one of the callers immediately after the end of the hour. Thus, the apparatus 50 may build a queue of callers which the user needs to contact which may be based on the order in which the attempted voice communications occur. For example, the message segments 112 for the first caller may suggest that the user will call the first caller in an hour. However, the messaging module 78 may then suggest message segments 112 for calling any additional callers back which take into account that the user may not call back the additional callers immediately after the end of the scheduled activity. Thereby, in some embodiments the apparatus 50 may calculate an expected call duration for the first caller and then suggest the time for calling back the second caller based on this. For example, if the scheduled activity ends in an hour, and voice communications with the first caller usually last five minutes, the messaging module 78 may suggest message segments indicating that the user will call the second caller in an hour and five minutes. In alternate embodiments, or in situations in which the apparatus 50 is unable to associate a call history with the caller, the apparatus may assume that voice communications with callers all last for approximately the same duration. Thereby, an expected call duration may be based on an average of all previous calls, may be user settable, or may be based on a default time period, for example 10 minutes. Similar calculations and suggestions for message segments 112 may occur for additional callers which thereafter enter the queue of missed calls during a scheduled activity or during an ongoing voice communication.

Further, in some embodiments the contextual characteristic determiner 80 may take into account the time of day. For example, if an activity ends at or after a predefined time, such as 10 PM, the contextual characteristic determiner may determine that it would be better to call back the person in the morning rather than late at night. Thereby, the messaging module 78 may suggest a message segment 112 which suggests calling the user back "in the morning," rather than when the activity ends.

Whether or not the user is engaged in a scheduled activity may in some embodiments be determined by analyzing various contextual characteristics which may be detected. For example, the apparatus 50 may use a microphone to detect whether the user is listening to a speaker at a meeting. Further, an accelerometer may be able to determine whether the user is stationary, which may be indicative that the user is seated at the meeting. Further, the apparatus may include a GPS module 82 or other module configured to determine the location of the apparatus 50. The processor 70 may be embodied as, include or otherwise control the GPS module 82. Using the information provided by the GPS module 82, the contextual characteristic determiner 80 may be able to determine if the user is presently located at the location where a scheduled event was supposed to occur. Thereby, if the contextual characteristic determiner 80 determines that the apparatus 50 is located at the location of a presently scheduled event, this provides additional information indicative that the user is indeed attending the scheduled event. Accordingly, this information may be used by the messaging module 78 when suggesting message segments 112 as described above. For example, the messaging module 78 may suggest a message segment candidate which states that the user will call the caller 102 at the end of the scheduled event.

In some embodiments the messaging module 78 may additionally or alternatively suggest message segments 112 based on social networking. In this regard, the contextual characteristic determiner 80 may determine the relationship of the user of the apparatus 50 to the caller 102. For example, the contextual characteristic determiner 80 may determine whether the user and the caller 102 are connected through a social networking service so as to therefore be considered friends. Thus, if the user and the caller 102 are personal friends, for example, the contextual characteristic determiner 80 may provide this information to the messaging module 78. The messaging module 78 may thereby suggest message segments 112 which are less formal. The contextual characteristic determiner 80 may also make a determination as to the relationship of the user and the caller 102 through other methods, for example, by reviewing stored contact information relating to the caller. Thus, the messaging module 78 may be provided with information from the contextual characteristic determiner 80 which allows the apparatus 50 to suggest message segments 112 which are tailored to the relationship of the user and the caller 102. Thereby, for example, message segments 112 which are more formal may be suggested when the user is responding to the user's boss as compared to when the user is responding to a personal friend. Further, in some embodiments the messaging module 78 may suggest message segments 112 based on content appearing on social networking services. For example, the messaging module 78 may suggest message segments 112 which include content posted by one or both of the user and the caller 102.

The apparatus 50 may further comprise an emotion recognizer 84 in some embodiments. The processor 70 may be embodied as, include or otherwise control the emotion recognizer 84. The emotion recognizer 84 may comprise a portion of the contextual characteristic determiner 80 in some embodiments, or the emotion recognizer may comprise a separate module, as illustrated in FIG. 2. The emotion recognizer 84 may be configured to recognize emotions as expressed by the user of the apparatus 50. For example, if the user speaks into the user terminal 10 in a calm manner, or drafts messages which say that he or she is having a good day, the emotion detector 84 may recognize that the user is happy. Alternatively, if the user yells during a voice communication, or drafts messages indicating that he or she is having a bad day, the emotion detector 84 may determine that the user is unhappy or angry. Other emotions may be recognized by the emotion detector 84 in a similar manner. Accordingly, the messaging module 78 may use the emotion recognized by the emotion recognizer 84 to suggest message segments 112. For example, FIG. 4 includes an ending phrase 112*d* which is a smiley face. The smiley face may be suggested due to the emotion recognizer 84 recognizing that the user is happy. In this manner, some embodiments of the apparatus 50 may suggest and/or allow manual entry of emotion-indicating icons, which may be referred to emoticons, only when the emotion recognizer 84 has recognized that the user is currently experiencing that emotion. Thereby, in some embodiments of the invention, the user may be able to draft a message with emoticons which have been certified by the emotion recognizer 84, which could thereby be used to confirm to the caller 102 receiving the message that the emotion conveyed in the message is actually the emotion being experienced by the user of the mobile terminal 10.

The message segments 112 suggested by the messaging module 78 may also be suggested based on various other contextual characteristics. For example, the messaging module 78 may review prior messages from the user sent to the caller 102, and suggest common phrases appearing in the previous messages. For example, if the user frequently includes the phrase "Love you!" in messages sent to the caller, one of the message segments 112, for example one of the ending phrases 112*d*, may include this language. Further, the messaging module 78 may take into account other contextual information provided by the contextual characteristic determiner 80 such as related actions by the user. For example, if the user previously rejected a call from the caller 102, the messaging module 78 may suggest message segments 112 which indicate that the user is "still busy". Accordingly, by suggesting message segments 112, the apparatus 50 provides the user with a relatively simple and quick way to draft messages which correspond to attempted voice communications. Thereby, communication between the caller 102 and the user of the apparatus 50 may be simplified and enhanced.

After a message is drafted, the user may cause transmission of the message by pressing a send button 118. However, the user may alternatively cancel the message and schedule a reminder in some embodiments using a cancel button 120. In this regard, embodiments of the apparatus 50 may also include a reminder scheduler 86, as illustrated in FIG. 2. The processor 70 may be embodied as, include or otherwise control the reminder scheduler 86. In some embodiments the reminder scheduler 86 may display a graphical timeline 122, as illustrated in FIG. 3, which the user may use to schedule a reminder by selecting a specific time at which the apparatus 50 will remind the user. In some embodiments the graphical timeline 122 may display which periods of time already have scheduled activities and which do not in order to help the user determine what would be a good time for a reminder. In other embodiments the reminder scheduler 86 may allow the user to select a duration of time from the present time at which the apparatus may remind the user. For example, the duration of time may be in increments of fifteen minutes, half hours, or hours in some embodiments. Accordingly, the user may be reminded about the attempted voice communication, and return the call if the user so desires.

Although embodiments of the apparatus 50 have generally been described in terms of receiving attempted voice communications, embodiments of the apparatus may additionally or alternatively be configured to cause transmission of the attempted voice communication. In other words, the apparatus 50 may initiate the attempted voice communication. In these embodiments, the message may accompany the voice communication, for example when the voice communication and the message are transmitted substantially simultaneously. However, in other embodiments the apparatus 50 may wait and transmit a message if and when the attempted voice communication is not answered by the recipient, or otherwise following termination of the attempted voice communication.

Sending a message when also causing transmission of a voice communication may be beneficial to provide the recipient of the call and message with an indication of what the call concerns. For example, if a child is calling a parent, the child may want to indicate that the purpose of the call is not urgent if that is the case. Thus, if the parent receives a message asking whether he can have candy, the parent may be inclined to ignore the call for the time being if the parent is busy doing something else. Otherwise, without the message, the parent may be inclined to always answer the call from the child because of fear than an emergency has occurred, which may be very disruptive to the parent. However, various other uses for the messages may be possible.

In this regard, the messaging module 78, contextual characteristic determiner 80, GPS module 82, emotion recognizer 84, and reminder scheduler 86 may operate in a substantially similar manner as described above with respect to when the apparatus 50 is configured to receive the attempted voice communication. For example, the GPS module 82 may calculate the location of the user, and then the contextual characteristic determiner 80 may determine that this location is the address of the user's friend, Conor. Thereby, the messaging module 78 may suggest message segments 112 which include "at Conor's house". Thereby, for example, the user could quickly and easily draft a message using the message segment 112 to send a message stating "At Conor's house. Ok if I stay?" that may be transmitted concurrent with the attempted voice communication. Accordingly, the recipient of the attempted voice communication may know the topic for conversation.

Further, the contextual characteristic determiner 80 may determine the relationship of the user to the recipient of the attempted voice communication. For example, as described above, the contextual characteristic determiner 80 may review the contact information for the recipient of the attempted voice communication and/or determine whether the user and the caller 102 are connected through a social networking service. Thus, if the user and the caller 102 are personal friends, for example, the contextual characteristic determiner 80 may provide this information to the messaging module 78. The messaging module 78 may thereby suggest message segments 112 which are less formal. As described above, the messaging module 78 may also make suggestions based on previous messages which the user has sent to the recipient of the attempted voice communication in the past. Accordingly, the apparatus 50 may suggest message segments 112 which accompany attempted voice communications, and thereby provide the user with a quick and easy way to draft messages when, for example, initiating a phone call or to follow up an attempted voice communication that went unanswered. Additionally, the reminder scheduler 86 may automatically prompt the user to schedule a reminder to try again later when the attempted voice communication is not answered.

Further, the reminder scheduler 86 may in some embodiments take into account the relationship of the user to the caller or the relationship of the user to the recipient of an attempted voice communication. For example, the reminder scheduler 86 may suggest calling back family members or unidentified callers first when the user misses more than one call. Also, the priority which the reminder scheduler 86 uses in setting reminders for calling back callers may be based on the subject matter of the call in instances in which the caller sends a message indicating the subject matter of the call. For example, the reminder scheduler 86 may look for key words indicating urgency, for example, "help," "emergency," etcetera. Additionally, in some embodiments the reminder scheduler 86 may prioritize the reminders based on the frequency of the attempted voice communications. For example, if a caller attempts to call the user several times during a short time period, the reminder scheduler 86 may determine that the caller urgently needs to contact the user. Accordingly, in various embodiments the reminder scheduler 86 may prioritize reminders for calling other persons based on determined urgency of the communications, relationship between the user and the caller, and various other factors.

Note that while the apparatus 50 is generally described above with respect to embodiments in which the apparatus is configured to provide for a voice communication, in other embodiments this is not necessarily the case. For example, the apparatus 50 may be configured to determine a contextual characteristic using the contextual characteristic determiner 80 and suggest a message segment based on the contextual characteristic using the messaging module 78 without providing for an attempted voice communication. This may be applied, for example, in the context of sending text messaging, posting status updates on a Social Networking Service (SNS), or posting messages on a web forum. The contextual characteristics in such instances may relate, for example, to prior messages created by the user of the apparatus 50. In the case of messages target for a particular recipient, for example text messages, the contextual characteristics may further relate to the recipient of the message. Thereby, the messages may be tailored to the recipient of the message in some instances. Accordingly, embodiments of the apparatus 50 may suggest messages based on contextual characteristics regardless of whether the apparatus provides for voice communications in some embodiments.

In terms of methods associated with embodiments of the present invention, the above-described apparatus 50 or other embodiments of apparatuses may be employed. In this regard, FIG. 5 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by a computer program product including computer program instructions. In this regard, the computer program instructions which embody the procedures described above may be stored by a memory device and executed by a processor of an apparatus. As will be appreciated, any such computer program instructions may be loaded onto a computer or other programmable apparatus (for example, hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block (s).

Accordingly, blocks of the flowchart support combinations of means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, one embodiment of a method comprises determining a contextual characteristic at operation 200. Further, the method may include suggesting a message segment based on the contextual characteristic in order to draft a message at operation 202. Additionally, the method may include causing transmission of the message at operation 204.

In some embodiments, certain ones of the above-described operations (as illustrated in solid lines in FIG. 5) may be modified or further amplified. In some embodiments additional operations may also be included (some examples of which are shown in dashed lines in FIG. 5). It should be appreciated that each of the modifications, optional additions or amplifications may be included with the above-described operations (200-204) either alone or in combination with any others among the features described herein. As such, each of the other operations as will be described herein may be combinable with the above-described operations (200-204) either alone or with one, more than one, or all of the additional operations in any combination.

For example, the method may further comprise recognizing a user emotion at operation 206, wherein the contextual characteristic comprises the user emotion. Further, the method may comprise providing for an attempted voice communication at operation 208. As described above, providing for an attempted voice communication includes, in one embodiment, providing for transmission of an attempted voice communication, such as by placing a voice call, and, in another embodiment, providing for reception of an attempted voice communication, such as by receiving a voice call and providing appropriate alerting, e.g., ringing, vibration, etc.

Therefore, the method may further comprise receiving the attempted voice communication at operation 210, wherein the message responds to the attempted voice communication. Accordingly, the method may further comprise scheduling a reminder to respond to the attempted voice communication at operation 212. Thus, in some embodiments of the method, the attempted voice communication is received. However, as illustrated at operation 214, in other embodiments the method may comprise causing transmission of the attempted voice communication, wherein the message accompanies the attempted voice communication. Accordingly, some embodiments of the method may involve placing a phone call or otherwise initiating an attempted voice communication. Further, the method may include suggesting an additional message segment at operation 216 and combining the additional message segment with the message segment to form the message at operation 218.

In an example embodiment, an apparatus for performing the method of FIG. 5 and other methods described above may comprise a processor (for example, the processor 70) configured to perform some or each of the operations (200-218) described above. The processor may, for example, be configured to perform the operations (200-218) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-218 may comprise, for example, the processor 70, the user interface 72, the communication interface 74, the messaging module 78, the contextual characteristic determiner 80, the emotion recognizer 84, and the reminder scheduler 86, and/or an algorithm executed by the processor for processing information as described above. However, the above-described portions of the apparatus 50 as they relate to the operations of the method illustrated in FIG. 5 are merely examples, and it should be understood that various other embodiments may be possible.

In some embodiments the operation 200 of determining a contextual characteristic may be conducted by means, such as the contextual characteristic determiner 80, the GPS module 82, and/or the processor 70. Further, the operation 202 of suggesting a message segment based on the contextual characteristic in order to draft a message may be conducted by means, such as the messaging module 78, the contextual characteristic determiner 80, and/or the processor 70. Additionally, the operation 204 of causing transmission of the message may be conducted by means, such as the communication interface 74, and/or the processor 70.

Further, the operation 206 of recognizing a user emotion may be conducted by means, such as the emotion recognizer 84, and/or the processor 70. Also, operation 208 of providing for an attempted voice communication may be conducted by means, such as user interface 72, the communication interface 74, and/or the processor 70. Further, the operation 210 of receiving the attempted voice communication and the operation 214 of causing transmission of the attempted voice communication may be conducted by means, such as the communication interface 74, and/or the processor 70. Also, the operation 212 of scheduling a reminder to respond to the attempted voice communication may be conducted by means, such as the reminder scheduler 86, and/or the processor 70. Additionally, the operation 216 of suggesting an additional message segment and the operation 218 of combining the additional message segment with the message segment to form the message may be conducted by means, such as the messaging module 78, and/or the processor 70.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the processor, cause the apparatus to:
   determine a contextual characteristic, wherein the contextual characteristic is based on at least on eof a current location, a current day, or a current time;
   generate a message based on the contextual characteristic, the message comprising a plurality of generated message segments and at least one message portion to be completed by the user;
   receive the at least one message portion;
   incorporate the at least one message portion into the message; and
   cause transmission of the message.

2. The apparatus of claim 1, wherein the message is generated in response to an incoming communication, and the contextual characteristic is identified based on at least a sender of the incoming communication.

3. The apparatus of claim 1, wherein the contextual characteristic is based on at least a calendar.

4. The apparatus of claim 1, wherein the contextual characteristic is based on at least a user.

5. The apparatus of claim 1, wherein the contextual characteristic is based on at least a prior communication.

6. A computer program product comprising at least one non-transitory computer-readable storage medium having computer-executable program code instructions stored therein, the computer-executable program code instructions comprising program code instructions to:
   determine a contextual characteristic, wherein the contextual characteristic is based on at least one of a current location, a current day, or a current time;
   generate a message based on the contextual characteristic, the message comprising a plurality of generated message segments and at least one message portion to be completed by the user;

receive the at least one message portion;

incorporate the at least one message portion into the message; and cause transmission of the message.

7. The computer program product of claim 6, wherein the message is generated in response to an incoming communication, and the contextual characteristic is identified based on at least a sender of the incoming communication.

8. The computer program product of claim 6, wherein the contextual characteristic is based on at least a calendar.

9. The computer program product of claim 6, wherein the contextual characteristic is based on at least a user.

10. The computer program product of claim 6, wherein the contextual characteristic is based on at least a prior communication.

11. A method comprising:

determining a contextual characteristic, wherein the contextual characteristic is based on at least one of a current location, a current day, or a current time;

generating with a processor a message based on the contextual characteristic, the message comprising a plurality of generated message segments and at least one message portion to be completed by the user;

receiving the at least one message portion;

incorporating the at least one message portion into the message; and causing transmission of the message.

12. The method of claim 11, wherein the message is generated in response to an incoming communication, and the contextual characteristic is identified based on at least a sender of the incoming communication.

13. The method of claim 11, wherein the contextual characteristic is based on at least a calendar.

14. The method of claim 11, wherein the contextual characteristic is based on at least a prior communication.

* * * * *

UNITED STATES PATENT AND TRADEMARK OFFICE
CERTIFICATE OF CORRECTION

PATENT NO. : 9,112,822 B2
APPLICATION NO. : 14/055122
DATED : August 18, 2015
INVENTOR(S) : Ollila et al.

Page 1 of 1

It is certified that error appears in the above-identified patent and that said Letters Patent is hereby corrected as shown below:

In the claims:

Column 14,
Line 36, "at least on eof" should read --at least one of--.

Signed and Sealed this
Twenty-third Day of February, 2016

Michelle K. Lee
*Director of the United States Patent and Trademark Office*